United States Patent
Marks et al.

(10) Patent No.: US 9,406,169 B2
(45) Date of Patent: Aug. 2, 2016

(54) SYSTEM AND METHOD FOR DATA COMPRESSION AND GRID REGENERATION

(71) Applicants: David B. Marks, Metairie, LA (US); Blake Peno, Long Beach, MS (US); Elias Z. K. Ioup, New Orleans, LA (US); Paul A. Elmore, Slidell, LA (US)

(72) Inventors: David B. Marks, Metairie, LA (US); Blake Peno, Long Beach, MS (US); Elias Z. K. Ioup, New Orleans, LA (US); Paul A. Elmore, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 42 days.

(21) Appl. No.: 14/578,096

(22) Filed: Dec. 19, 2014

(65) Prior Publication Data

US 2016/0180586 A1    Jun. 23, 2016

(51) Int. Cl.
  *G06T 15/30* (2011.01)
  *G06T 17/20* (2006.01)
  *G06T 1/20* (2006.01)

(52) U.S. Cl.
  CPC . G06T 17/20 (2013.01); G06T 1/20 (2013.01); *G06T 2200/04* (2013.01)

(58) Field of Classification Search
  None
  See application file for complete search history.

(56) References Cited

PUBLICATIONS

Marc van Kreveld "Algorithms for triangulated terrains", Jul. 29, 2005, SOFSEM '97: Theory and Practices of Informatics; vol. 1338 of the series Lecture Notes in Computer Science pp. 19-36.*
Pajarola, Renato, Zurich, Eth, Large Scale Terrain Visualization Using the Restricted Quadtree Triangulation, The Computer Society, IEEE, 1998.
Guibas, Leonidas, Stolfi, Jorge, Primitives for the Manipulation of General Subdivisions and the Computation of Voronoi Diagrams, pp. 74-123, ACM Transactions on Graphics, vol. 4, No. 2, Apr. 1985.
Evans, W., Kirkpatrick, D., Townsend, G. Right-Triangulated Irregular Networks, Algorithmica, pp. 264-286, 2001.
Suarez, J.P., Plaza, A., Four-triangles adaptive algorithms for RTIN terrain meshes, Mathematical and Computer Modeling 49, pp. 1012-1020, 2009.
Sivan, Ron, Samet, Hanan, Algorithms for Constructing Quadtree Surface Maps, Proceedings 5th International Symposium on Spatial Data Handling, Aug. 3-7, 1992, pp. 361-370.

* cited by examiner

*Primary Examiner* — Kee M Tung
*Assistant Examiner* — Frank Chen
(74) *Attorney, Agent, or Firm* — US Naval Research Laboratory; Scott G. Bell

(57) ABSTRACT

System and method for compressing electronic data such as, for example topological data (altitude/depth) or geospatial data (latitude/longitude) with constrained loss of fidelity. With respect to altitude/depth data, the system and method allow for a mixture of shoreline and deep water to be thinned within the same mesh without appreciable loss of information in either region. System and method retain underlying grid values, opening RTIN functionality for any sphere where original grid positions must be preserved. System and method provide for encryption/decryption of electronic data.

14 Claims, 17 Drawing Sheets
(7 of 17 Drawing Sheet(s) Filed in Color)

|  | | 1m | 3m | 10m | 30m | 100m | 300m |
|---|---|---|---|---|---|---|---|
| 0.03% | 19.75 | 3.81 | 0.79 | 0.09 | 0.01 | 0.01 | 0.00 |
| 0.1% | 8.44 | 20.30 | 19.76 | 19.75 | 19.75 | 19.75 | 19.75 |
| 0.3% | 5.24 | 9.78 | 8.54 | 8.44 | 8.44 | 8.44 | 8.44 |
| 1% | 3.42 | 7.39 | 5.41 | 5.25 | 5.24 | 5.24 | 5.24 |
| 3% | 2.79 | 6.06 | 3.75 | 3.44 | 3.42 | 3.42 | 3.42 |
| 10% | 2.22 | 5.70 | 3.24 | 2.82 | 2.80 | 2.79 | 2.79 |
| 50% | 1.79 | 5.29 | 2.73 | 2.26 | 2.23 | 2.22 | 2.22 |
| 100% | 1.73 | | | 1.84 | | | |
| 200% | 1.71 | | | 1.78 | | | |
| 400% | 1.70 | | | 1.76 | 1.71 | 1.71 | 1.70 |
|  |  |  |  | 1.76 |  |  |  |

FIG. 12B

SYSTEM AND METHOD FOR DATA COMPRESSION AND GRID REGENERATION

CROSS-REFERENCE TO RELATED APPLICATIONS

None.

BACKGROUND

Methods and systems disclosed herein relate generally to data compression, and more specifically compression of geospatial data, for example, but not limited to, altitude and depth or latitude and longitude, with constrained loss of fidelity.

Government agencies are responsible for maintaining global databases for the making of, for example, but not limited to, aeronautical/hydrographic charts and terrain map products. A global 100 m grid requires ~1 Tbyte of storage space, a 10 m grid requires ~100 Tbytes of storage space. Among other problems managing these large data sets, there are presently no compression methods in use for bathymetry grids. Unlike image compression, grid compression can retain the surface shape. Right Triangulated Integrated Networks (RTINs) have been used extensively in Computer Graphics for high-speed rendering of 3 D scenes. As this technology is mature, it has been selected as the best candidate for computationally efficient thinning of topological grids.

Significant size reduction was demonstrated using the RTIN Top Down approach (creating a RTIN from a set of points and adding in more detail/triangles as needed to preserve fidelity) Petry, F. R. et al. (2014), *Right triangular irregular networks approaches for variable resolution bathymetry*, submitted to *Computers and Geosciences*. However, the Top Down approach does not preserve the original grid points, a requirement for charting applications using topological grids. What is needed is a developed bottom-up approach, i.e. an approach that starts with a full grid and iteratively eliminates triangles (Pajarola, R. & E. Gobbetti (2007), *Survey of semi-regular multi-resolution models for interactive terrain rendering, Visual Computing*, 23, 583-605).

Improper tessellation can arbitrarily limit the amount of thinning possible within a given mesh. What is needed is a tessellation of triangles into a unique RTIN structure to allow for proper thinning to take place. Right-TIN creation results in a non-unique Delaunay mesh. What is needed is a process to determine valid removable vertices (also referred to herein as points) within the RTIN and the orientation of the removable edges. Improper vertex or edge removal can result in either the destabilization of the RTIN structure (a mesh that is no longer an RTIN) or an irreducible RTIN (a configuration that cannot be further reduced without becoming destabilized). What is needed is proper vertex and edge detection to ensure that all RTINs can be fully reduced. What is needed is an approach that utilizes a combination of metrics to, for example, but not limited to, retain data in the shallows while trimming flat areas of little interest.

SUMMARY

The system and method of the present embodiment can compress geospatial data, for example, but not limited to, altitude/depth, with constrained loss of data fidelity. With respect to the use of bathymetry data, the present embodiment allows for a mixture of shoreline and deep water to be thinned within the same mesh without appreciable loss of information in either region. The system and method of the present embodiment retain underlying grid values, opening RTIN functionality for any sphere where original grid positions must be preserved. With properly configured user metrics, large amounts of unneeded data can be thinned away in a rapid and efficient manner. Thinned results are more transportable and manageable with minimal loss in fidelity. Thinned grids retain original grid points deemed to be retained with full accuracy. Compression algorithms of the present embodiment achieve significant reduction in points and size reduction, and can also be used to create "encrypted" data, i.e. data that cannot be reconstructed without knowledge of the process used to compress the data. Compression and regridding algorithms of the present embodiment process a 1025×1025 grid (2°×2° area with 200 m resolution) in about one minute with acceptable residual.

The system and method of the present embodiment provide a developed bottom-up approach that preserves original points deemed necessary by pre-selected thinning criteria. The present embodiment provides a tessellation of triangles into a unique RTIN structure to allow for proper thinning to take place. The present embodiment also provides a process to determine valid removable vertices within the RTIN and the orientation of the removable edges. When valid vertices are selected/found, an orientation for the edge that would be removed along with the valid vertex is also chosen based on the vertex's location in the grid and the iteration count of the process (explained later). The vertex and edge detection ensure that all RTINs can be fully reduced. The present embodiment can utilize a combination of metrics to retain data, for example, but not limited to, in the shallows in bathymetric data while trimming flat areas of little interest.

The method of the present embodiment can include, but is not limited to including, the steps of creating a Delaunay mesh from a previously gridded surface, and tessellating the resulting triangles to obtain a RTIN structure that can be fully reduced to two triangles. A proper tessellation can start with the bottom-left point, and, in this case, the two triangles are orientated so that their hypotenuse make a '/', touching the bottom-left point. The method can further include an iterated process to determine proper edges to delete based on location within the mesh and an iteration number, removing the vertex and edge if the difference is within a supplied pair of thresholds, and merging the triangles. Vertices within the mesh that lie between four right angles, or two right angles for vertices along the edges, are selected. Thinning criteria are applied to compare the selected vertices to determine if they can be removed. An interpolated value of the point is calculated as if the point weren't there, based on the two points along the longer line as indicated by the location within the mesh and iteration number if the point were removed. The interpolated value is compared to the actual value. If the point is lower than a given threshold, the point can be removed without reducing information in the mesh. The process is continued generally for, for example, but not limited to, 10-14 iterations to get to the point of no new viable points to remove. Then after the grid is fully thinned, and possibly resides in memory, the grid can be accessed by one of several methods. An exemplary way to merge the triangles is as follows: the bounding diamond of edges surrounding the removed point is located. All edges connecting to the removed point are removed. An edge connecting two points of the bounding diamond is redrawn based on the location within the grid and the iteration number. The orientation of the edge that is redrawn is determined via the location in the mesh and the iteration number. This edge is the same edge possessing the points used to interpolate the value of the point that was removed. Selection of thresholds determines the results of the thinning process. The goal is to remove points in grid that are unneeded while leaving points representing valuable data. Two criteria are, for example, but not limited to, distance and percentage. These can be selected, for example, but not limited to, by the user or by any other method. Both of the criteria compare the difference between a characteristic of the considered point against the linear interpolation of the characteristic. For example, a distance metric can be used that specifies a flat value and flattens out areas that vary less than a threshold. Further, a percentage metric can be used that specifies a dynamic value as a percentage of the considered point and retains, for example, bathymetric shallow areas that would otherwise be lost. Still further, if the data include storage placeholders, these can be removed, along with removing highly uncertain points based on an uncertainty threshold, and removing points from specific regions through threshold/percentage criteria in different regions or applied to specific points.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 12B is a table of the percentage of the original number of points remaining after thinning.

DETAILED DESCRIPTION

The problems set forth above as well as further and other problems are solved by the present teachings. These solutions and other advantages are achieved by the various embodiments of the teachings described herein below.

The present embodiment tessellates the triangles of a Delaunay mesh of a gridded surface, such as, for example, but not limited to, a bathymetric grid, into a unique RTIN structure, the gridded data having been quality controlled and converted to a standard gridded format. The present embodiment determines valid removable vertices within the RTIN and the orientation of the removable edges (necessary to preserve the tessellation pattern). The present embodiment, by use of thresholds, retains data, for example, in the shallows while trimming flat areas of little interest.

Figure 1A:
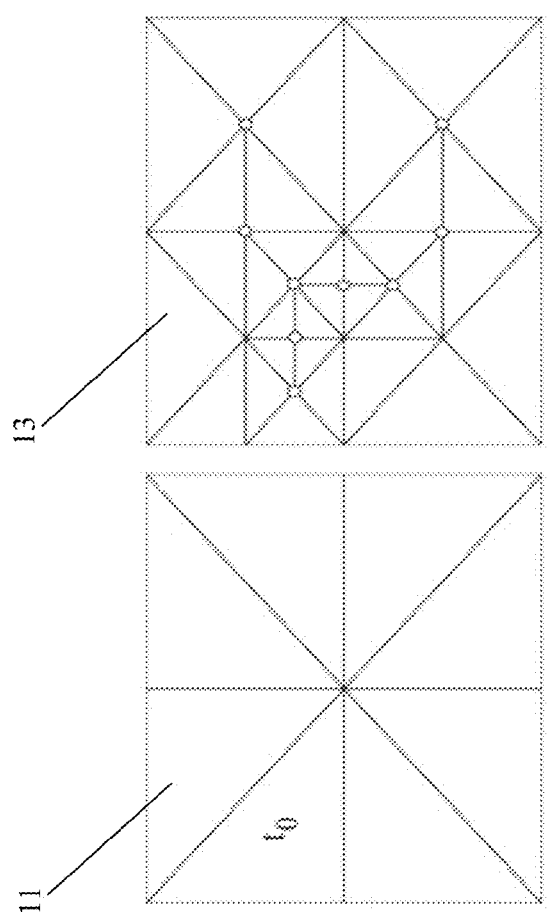
FIG. 1A Prior Art is a graphical illustration of the Top-Down approach in which an RTIN is created, and then more detail is added to preserve fidelity to the original data.

Referring now to FIG. 1A Prior Art, the Top-Down approach of the prior art starts with coarse level grid 11 and adds more nodes to dense grid 13. The Top-Down approach is invalid for the application to bathymetric data because all original point locations are lost in the process. This is because the Top-Down approach starts with a perfectly square, fully-thinned RTIN and adds triangles until the RTIN satisfies a preset level of refinement. By starting with a dense grid and removing points, the Bottom-Up approach retains the original points, a vital feature for bathymetric data and other forms of data arising out of sensor readings.

Figure 1B:
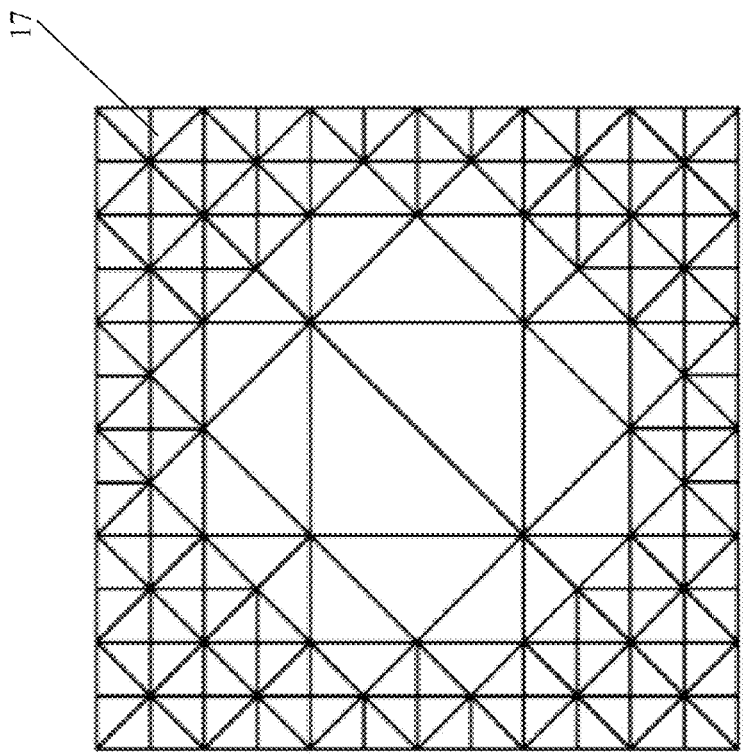
FIG. 1B is a graphical illustration the Bottom-Up approach of the present embodiment in which detail is removed from an RTIN while retaining fidelity to the original data through adhering to specific thinning selection criteria.
Figure 1B:
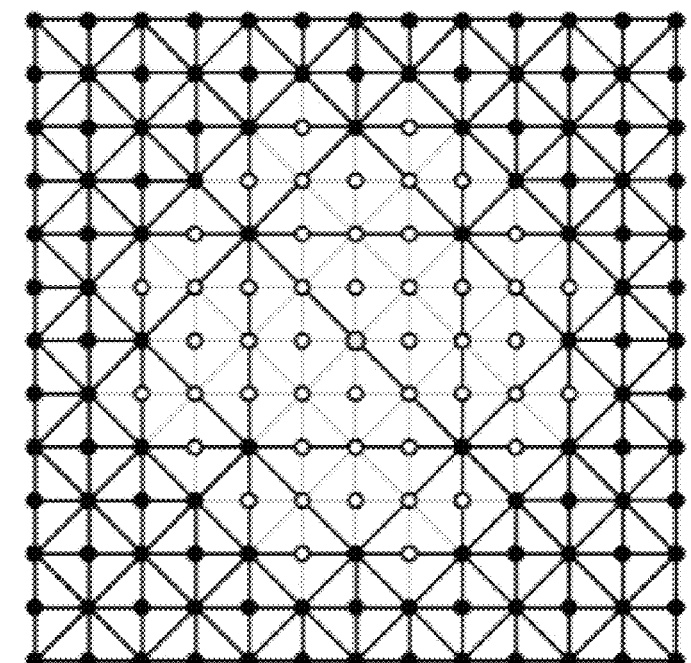

Referring now to FIG. 1B, the Bottom-Up approach of the present embodiment starts with dense grid 15 and removes points while maintaining the RTIN in thinned grid 17. Criteria for grid point removal can be determined by, for example, but not limited to, user input and electronic computations. The Bottom-Up approach results in more control of the data, for example, topographic control, than the Top-Down approach, because the Bottom-Up approach works with the actual full grid. The output can be directly compared to the original grid without any adjustment. As the original points are lost with the Top-Down approach, any attempt to track down an anomaly in the data, for instance, will require figuring out what part of the original data translates to the anomaly.

Figure 2:
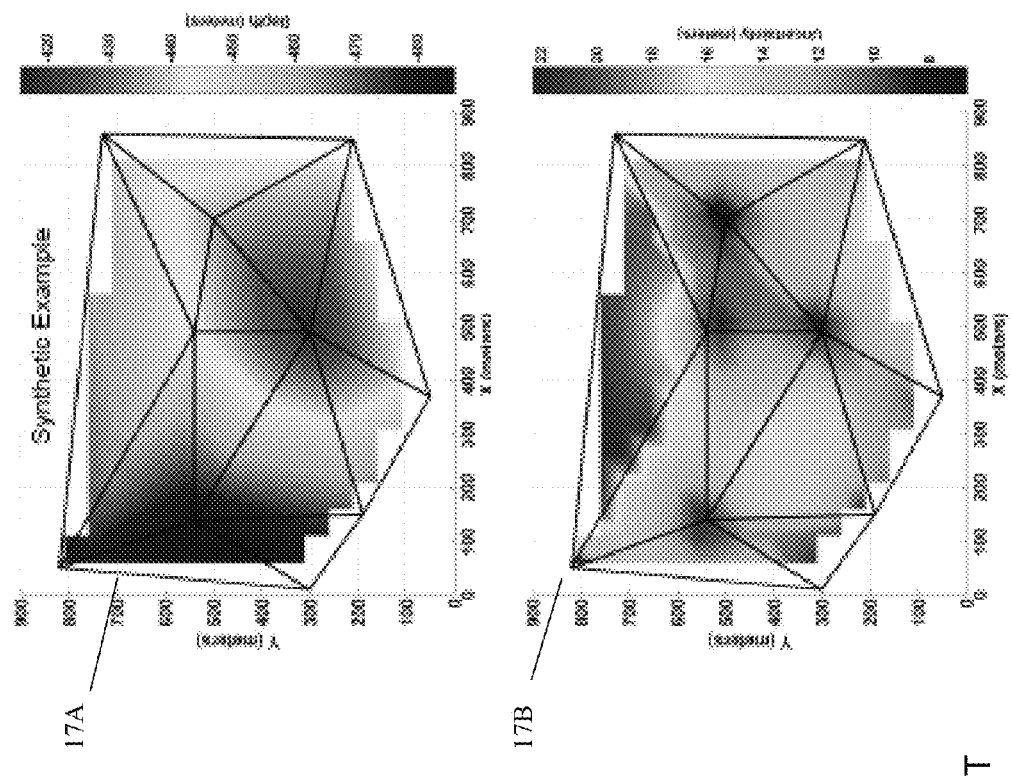
FIG. 2 Prior Art is a graphical illustration of the TIN technique.

Referring now to FIG. 2, Prior Art, Triangular Irregular Network (TIN) is an alternative to the system and method of the present embodiment. In the TIN technique, contiguous irregular triangular meshes 17A and 17B are created by maximizing the angles of the triangles in the mesh. TIN technology can be appropriate for sparse, irregularly-spaced data. However, TIN point removal results in recalculation, and its focus is on general point space versus point localization.

Figure 3:
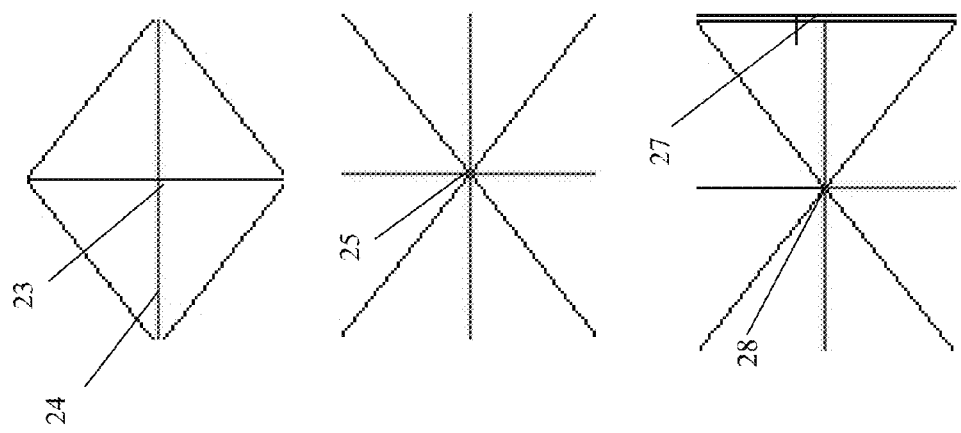
FIG. 3 is a graphical illustration of the system and method of the present embodiment in which points are selected for removal based on pre-selected criteria.

Referring now to FIG. 3, in the system and method of the present embodiment, (1) points are located for potential deletion, (2) an edge is selected to use for deletion evaluation, (3) the point is evaluated using the edge selected and pre-chosen criteria, and (4) the point and the line not selected in (2) are removed if the pre-selected criteria are satisfied. With respect to (1), points are located for potential removal if they are completely surrounded by right (90°) angles, either two along the edge or four within the interior. For example, point 23 is surrounded by four right angles. Point 23 could be valid for removal along with horizontal edge 24. Point 25 is surrounded by eight 45° angles, and is not valid for removal and will stay for the next iteration. Even though point 25 remains, edges connected to point 25 can be deleted because point 25 borders other points that are valid for removal. On the next iteration, point 25 will have four right angles left and will be a valid removal point. Point 27 is along the edge of the grid that is bordered by two right angles and thus is valid for removal. Point 28 is surrounded by eight 45° angles and is not a valid removal point.

Continuing to refer to FIG. 3, and with respect to (2), an edge is selected to use for deletion evaluation. An exemplary process for edge selection starts with initializing two iteration counters, I and E, to 0 and calculating $G=2^E$. For each right-angle point discovered in the mesh, the following computations are alternated, based on I. Alternative one begins with calculating $\alpha$ as the y coordinate of the point modulo 2*G. If $\alpha \leq G$ and $\alpha \neq 0$ then the edge orientation is vertical. If $\alpha > G$ or $\alpha = 0$, the edge orientation is horizontal. Alternative two begins with calculating $\alpha$ as the y coordinate of the point modulo 2*G and $\beta$ as the x coordinate of the point modulo 2*G. If $\alpha \leq G$ and $\alpha \neq 0$, and $\beta \leq G$ and $\beta \neq 0$ then the edge orientation is vertical. If $\beta > G$ or $\beta = 0$, then the edge orientation is horizontal. If $\alpha > G$ or $\alpha = 0$, and if $\beta \leq G$ and $\beta \neq 0$, then the edge orientation is horizontal. If $\beta > G$ and $\beta = 0$, then the edge orientation is vertical. After orientations for all edges are found, (a) E is incremented if its modulo 2=0, (b) I is incremented, and (c) the above alternatives are repeated. Thus, the selected edge depends on the variables I, E, and G which vary based on the iteration of the process, and $\alpha$ and $\beta$ which vary based on mesh location.

Continuing to still further refer to FIG. 3, and with respect to (3), a point is evaluated using the edge selected and pre-selected criteria. With respect to (4), a point is deleted if the difference between its value and the interpolation of its value along the line selected by the preceding process is found to be within pre-selected criteria. Between iterations of edge selection, after the edge orientation is determined for all potentially removable points, each point is evaluated along that edge using the pre-selected criteria with those satisfying the criteria removed. Any points that fail the criteria are removed as viable candidates for future iterations. Then all potential points for deletion are found again and the process executes another iteration. The process finally stops when no potential deletion points can be found (i.e., no points remain unchecked that are surrounded by right angles). The two neighbor points used to interpolate the value of the point in question are the neighbor points along this line. The line deleted if the point is deleted is the line along the opposite orientation. In the case of diagonal lines, a vertical orientation indicates the "/" orientation, and the horizontal orientation indicates the "\" orientation.

Figure 4A:
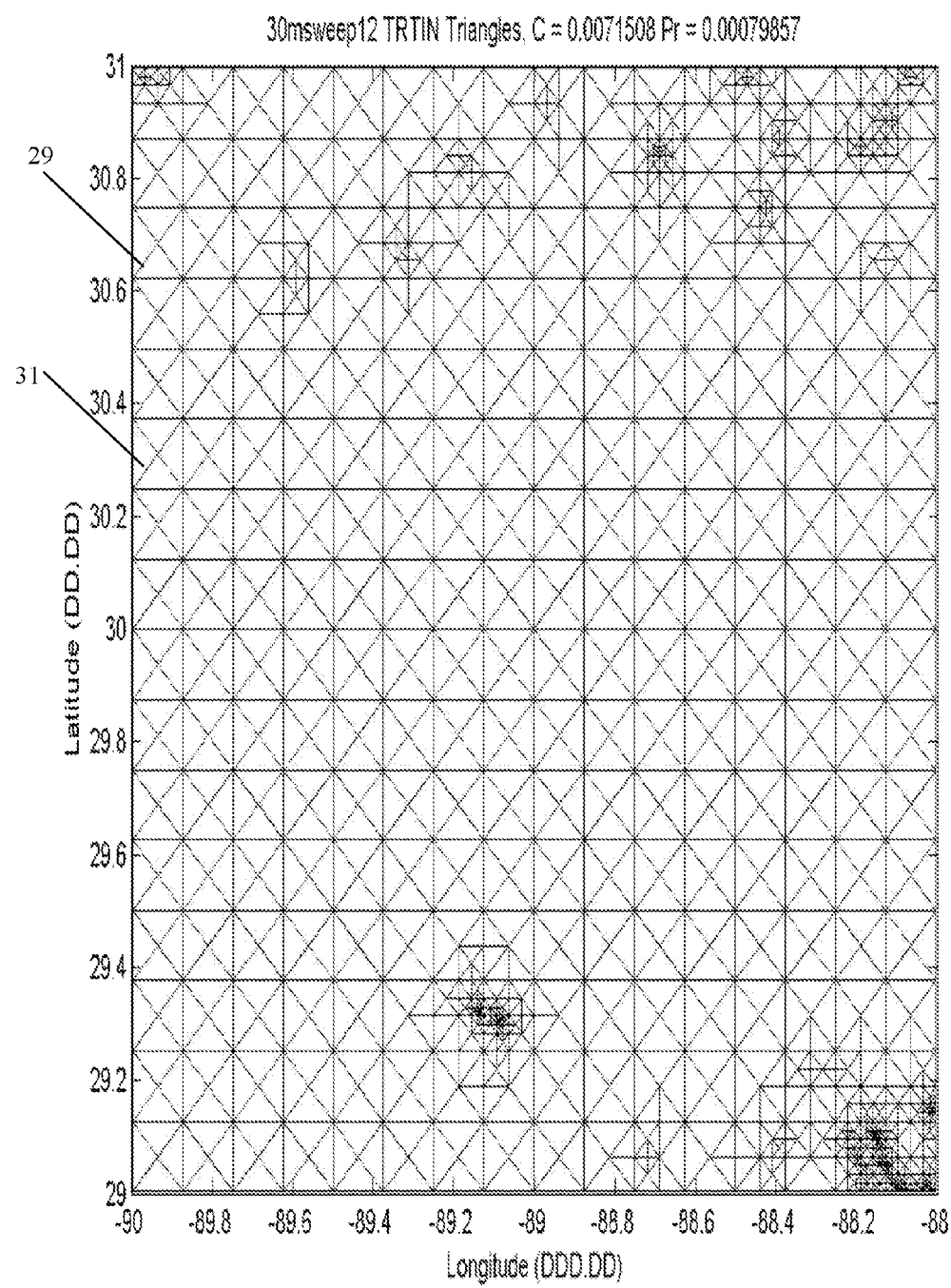
FIG. 4A is a graphical illustration of iteration 12 of a grid being thinned, with lines set for deletion in red, demonstrating how the orientation of removed lines vary with location in grid and iteration.
Figure 4B:
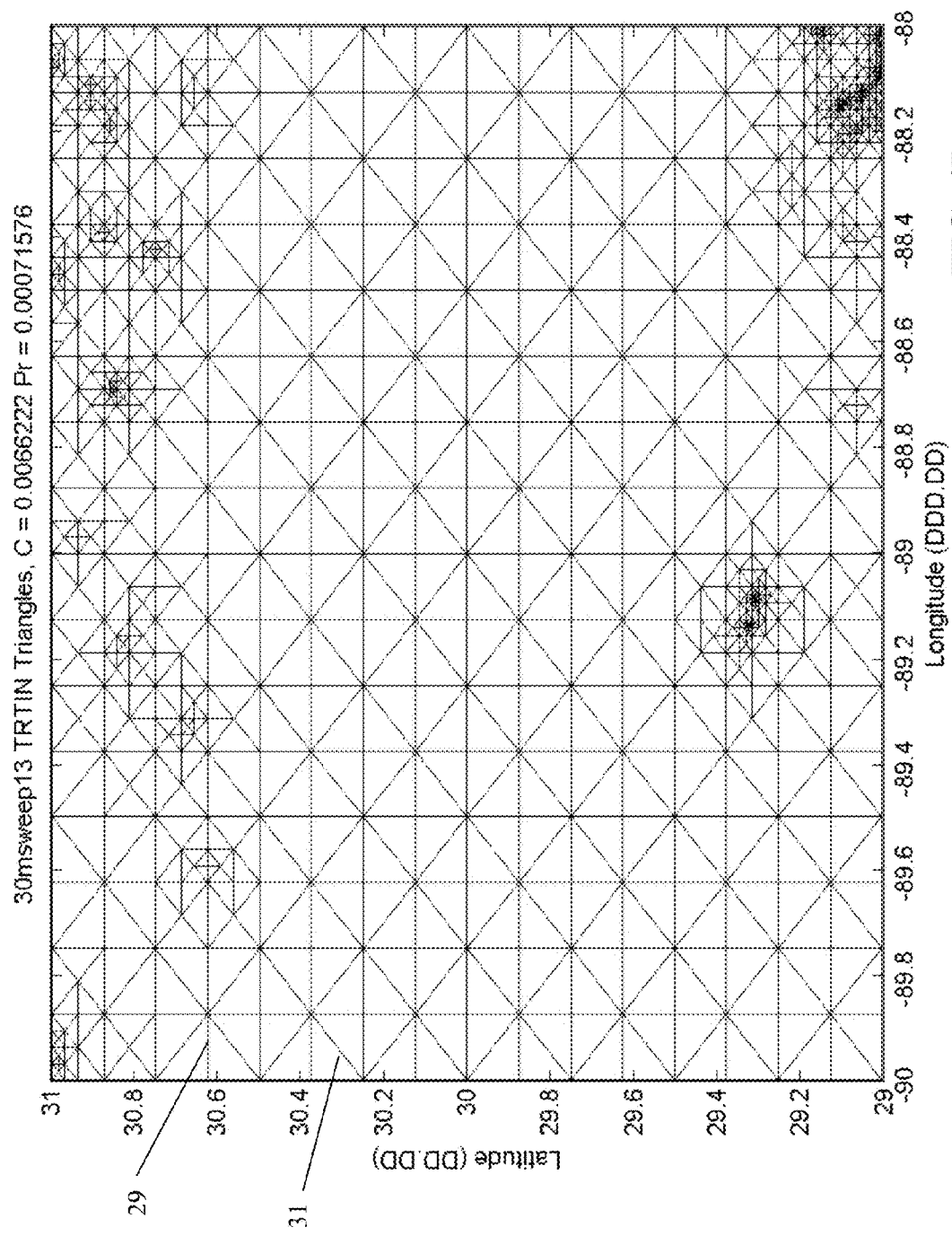
FIG. 4B is a graphical illustration of iteration 13 of the grid of FIG. 5A being thinned, with lines set for deletion in red, demonstrating how the orientation of lines vary with location in grid and iteration.

Referring now to FIGS. 4A and 4B, red lines 29 are edges that are being removed, black lines 31 are edges that are being left in place on successive iterations of the method of the present embodiment.

Figure 5:
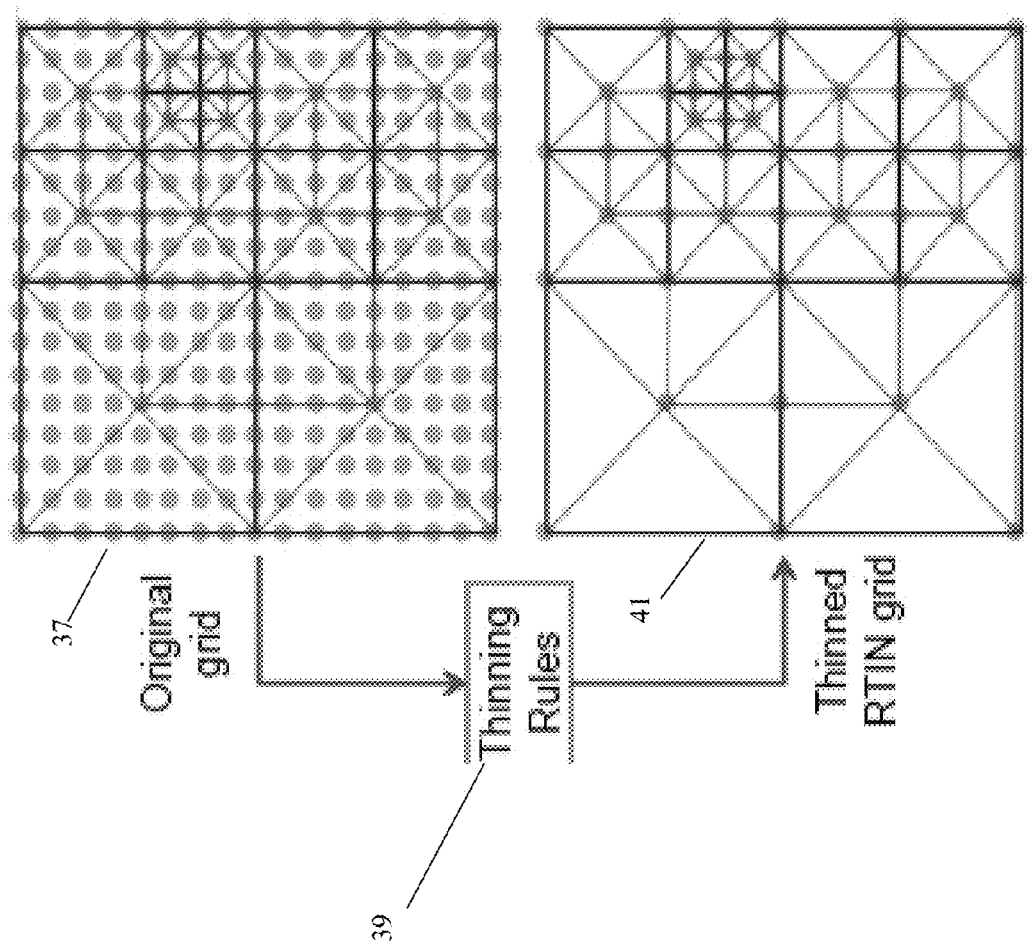
FIG. 5 is a graphical illustration of a grid as it is subjected to the thinning rules of the present embodiment.

Referring now to FIG. 5, original grid 37 is shown before it is subjected to thinning rules 39 producing thinned grid 41. The western area of the data contains mostly flat areas with few features while the eastern side, particularly the fully populated area in the northeast has lots of variability.

Figure 6:
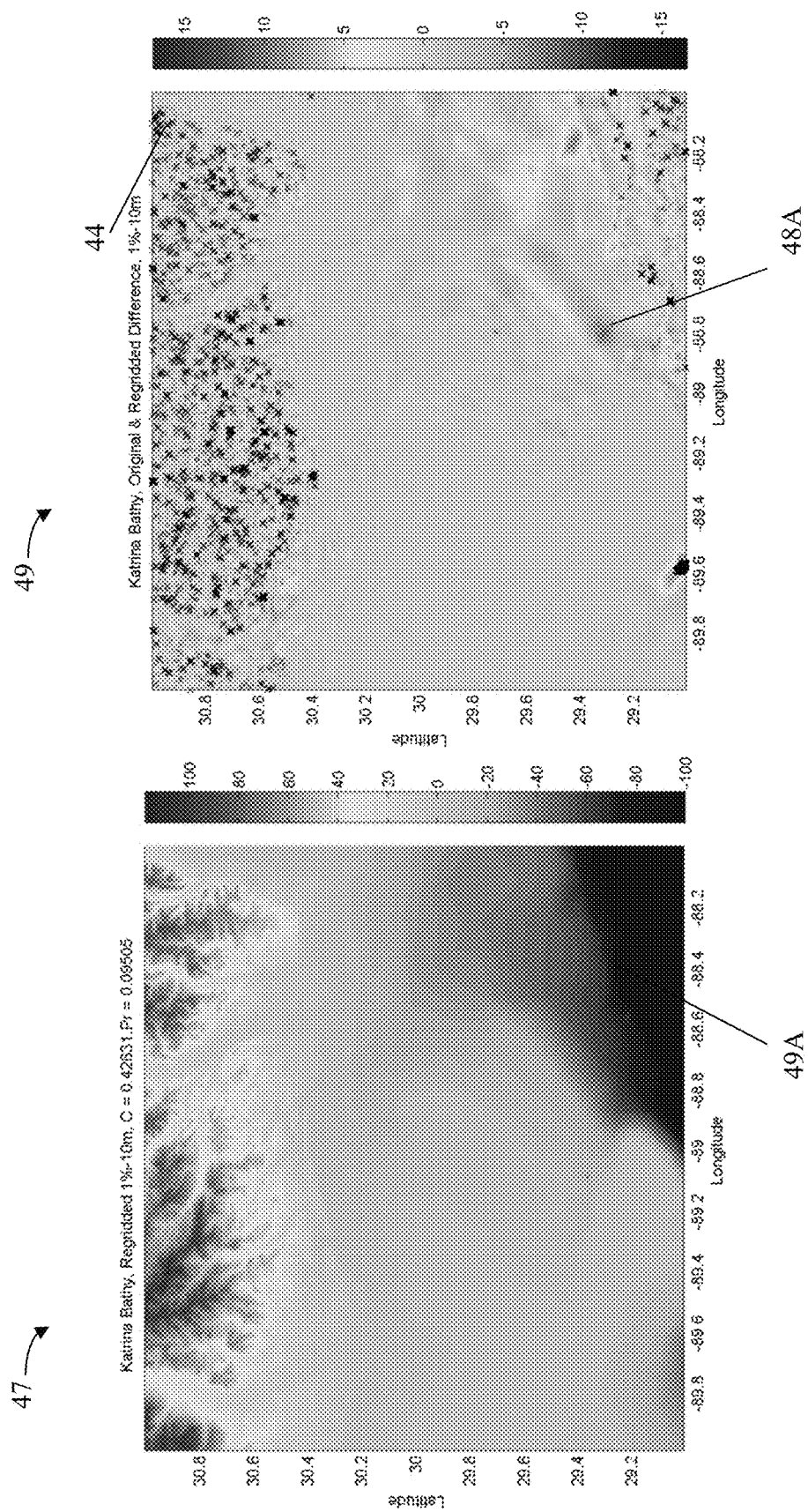
FIG. 6 is a graphical illustration of a color map of bathymetry for a regridded area accompanied by a color map of the residual difference between the original bathymetry and the regridded values.

Referring now to FIG. 6, graph 47 illustrates bathymetry of the thinned mesh according to the method of the present embodiment, while graph 49 illustrates the difference between the thinned mesh bathymetry and the original bathymetry. As can be seen most of data closely match, with the biggest differences 48A located in the deeper portions 49A of the data, with some sporadic spots in the shallower areas. Black X's 44 on graph 49 illustrate areas where the difference exceeds specified criteria, but do not reflect any areas of excessive variance.

Figure 7:
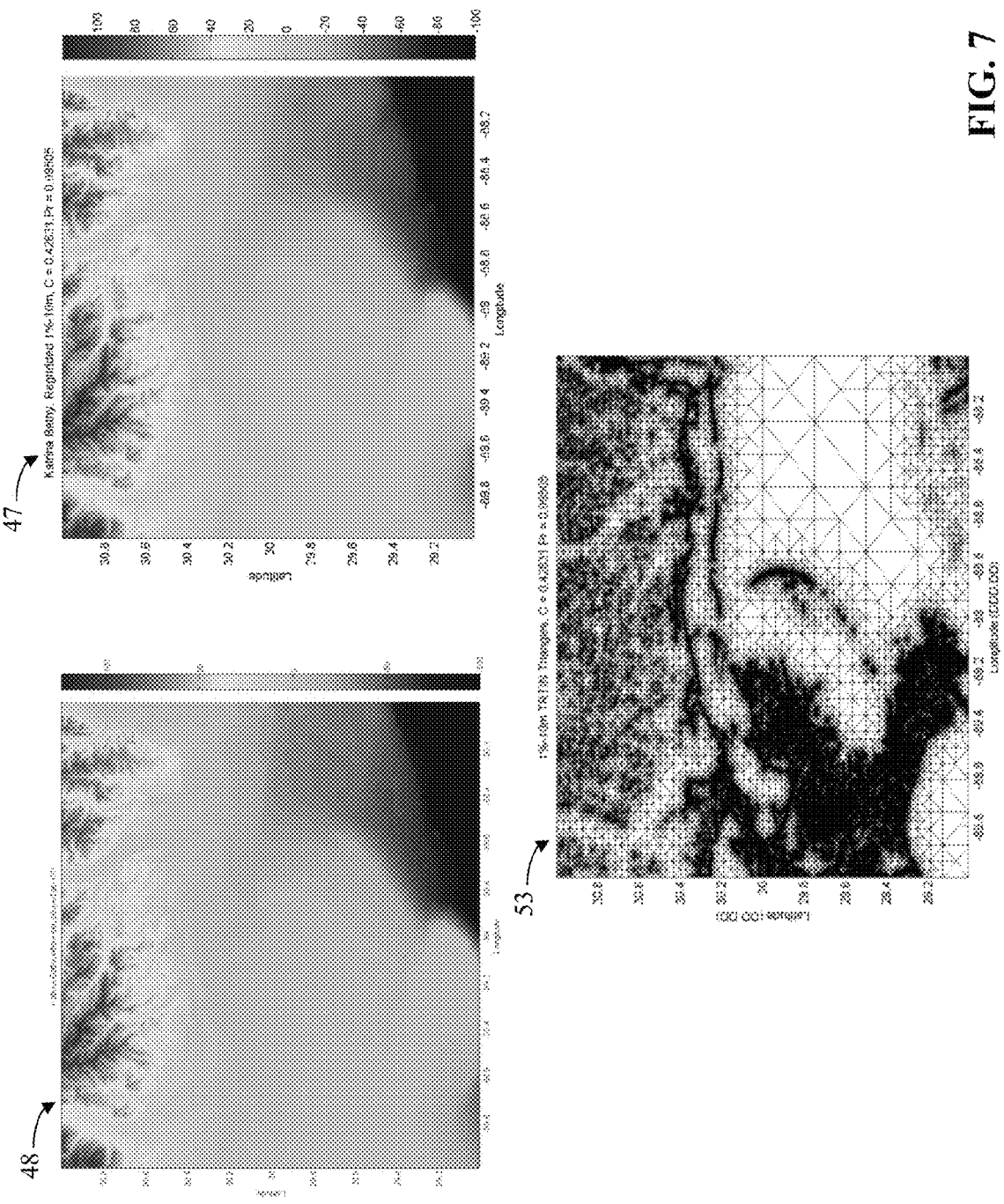
FIG. 7 is a graphical illustration of an original grid juxtaposed against a thinned grid and thinned RTIN.

Referring now to FIG. 7, original grid 48 is juxtaposed against thinned grid 47 and thinned RTIN 53. Thinning criteria applied against original grid 48 were 1% and 10 m. These criteria produced thinned grid 47 and thinned RTIN 53, reducing the size of thinned grid 47 to 10% of original grid 48 without appreciable loss of detail, as shown.

Figure 8:
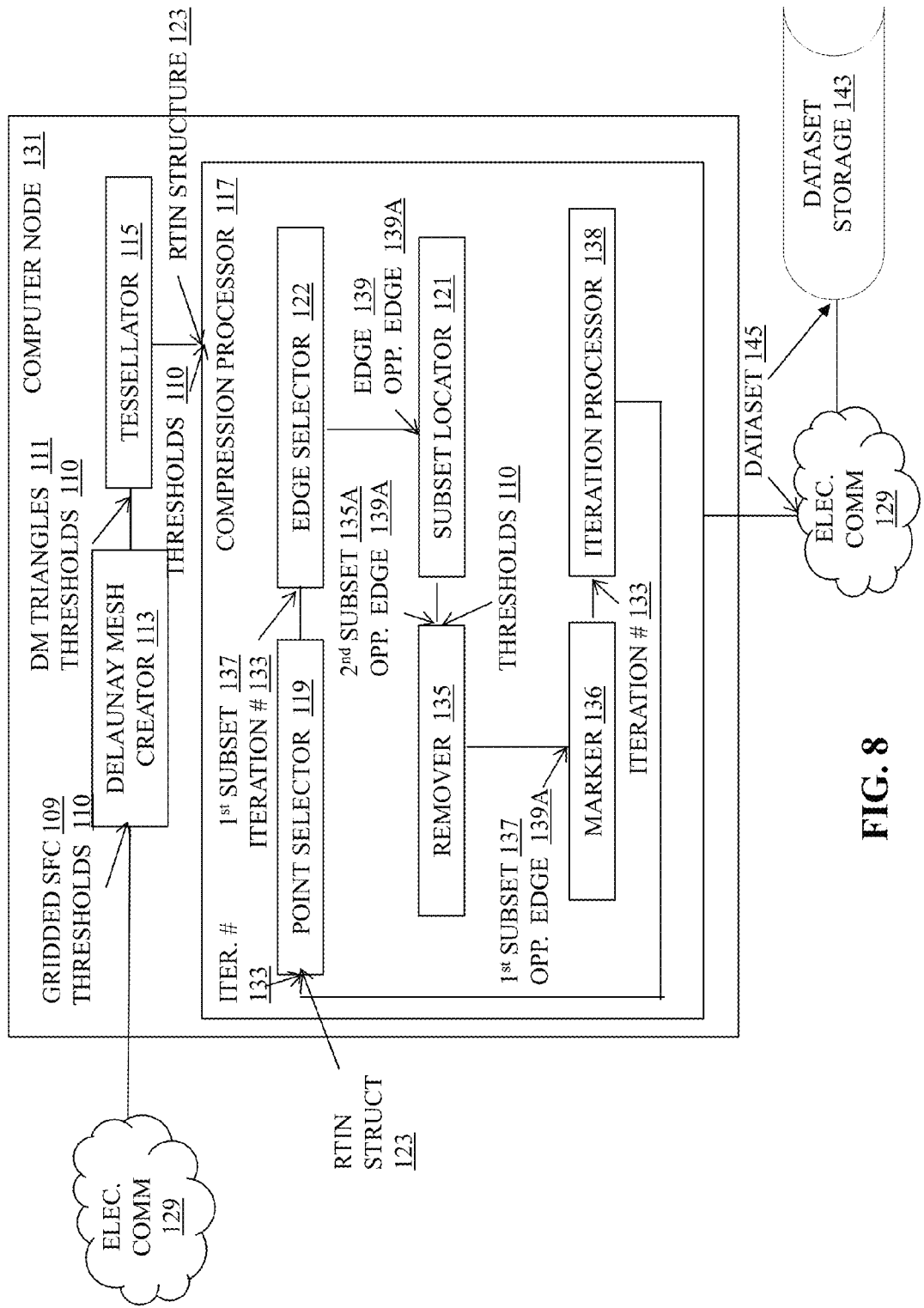
FIG. 8 is a schematic block diagram of an embodiment of the system of the present teachings.

Referring now to FIG. 8, system 100 for compressing electronic data can include, but is not limited to including, Delaunay mesh creator 113, executing on a special purpose computer, creating a Delaunay mesh from gridded surface 109 of the electronic data, the Delaunay mesh having resulting triangles 111. Delaunay mesh creator 113 can receive gridded surface 109 through, for example, electronic communications 129. Thresholds 110 can also be received by any of Delauney mesh creator 113, tessellator 115, or compression processor 117, for example, or by any other means, and from any source including a user or through a computation means. System 100 can also include tessellator 115, executing on the special purpose computer, tessellating resulting triangles 111 to form right-triangulated irregular network (RTIN) structure 123 being capable of being fully reduced to two triangles if the original grid possesses dimensionality of $2^n+1$ by $2^n+1$. The RTIN structure can include a plurality of points and a plurality of edges. System 100 can still further include compression processor 117 compressing, by the special purpose computer, the electronic data using RTIN structure 123 and pre-selected criteria (thresholds) 110. Compression processor 117 can reduce RTIN structure 123 by iterating, through iteration processor 138, for example, but not limited to, point selector 119, edge selector 122, subset locator 121, remover 135, and marker 136 using iteration number 133. Point selector 119, executing on the special purpose computer, can select a first subset of points 137 from the plurality of points in RTIN structure 123 based on angles that edges of the plurality of edges form with each of the plurality of points. Edge selector 122, executing on the special purpose computer, for each of the points in first subset 137, can select edge 139 from the plurality of edges for deletion evaluation based on iteration #133 and the selected point. Edge 139 can have opposing edge 139A of opposite orientation from edge 139. Subset locator 121, executing on the special purpose computer, can locate second subset 135A of the plurality of points. Second subset 135A can include the points of the plurality of points along selected edge 139. Remover 135, executing on the special purpose computer, can remove the selected point and opposing edge 139A if the points of the second subset meet the pre-selected criteria or thresholds 110. For each of the points in first subset 137, marker 136, executing on the special purpose computer, can mark the not-removed selected points as not available to be selected by point selector 119 during the next pass through the iteration of actions in compression processor 117. Among other actions required for computer iteration, iteration processor 138 can increment iteration number 133 and repeat execution of point selector 119, edge selector 122, subset locator 121, remover 135, and marker 136 until no points are found by point selector 119. When no points are found by point selector 119, dataset 145 can be created and can include numbers of x and y values in gridded surface 109, $\Delta x$ and $\Delta y$ of gridded surface 109, and the x/y/z values remaining after compression processor 117 completes its iteration. Dataset 145 can be stored, requiring much reduced storage area compared to gridded surface 109, in dataset storage 143, through, for example, electronic communications 129. An exemplary method to merge triangles 141 can include locating the bounding diamond of edges 139 surrounding point 137 to be removed, removing all edges 139 connected to the removed point 137, redrawing edge 137 connecting two remaining points of the bounding diamond based on a location within gridded surface 109 and iteration number 133. Pre-selected criteria or thresholds 110 can include the difference between a characteristic of a selected point and a linear interpolation of the characteristic at the selected point. The characteristic can include, for example, a distance metric specifying a flat value, the flat value flattening areas that vary less than the pre-selected criteria, a percentage metric specifying a dynamic value as a percentage of the characteristic of the selected point, and/or a gradient. Compression processor 117 can receive thresholds 110 from, for example, a user or any other means.

Figure 9:
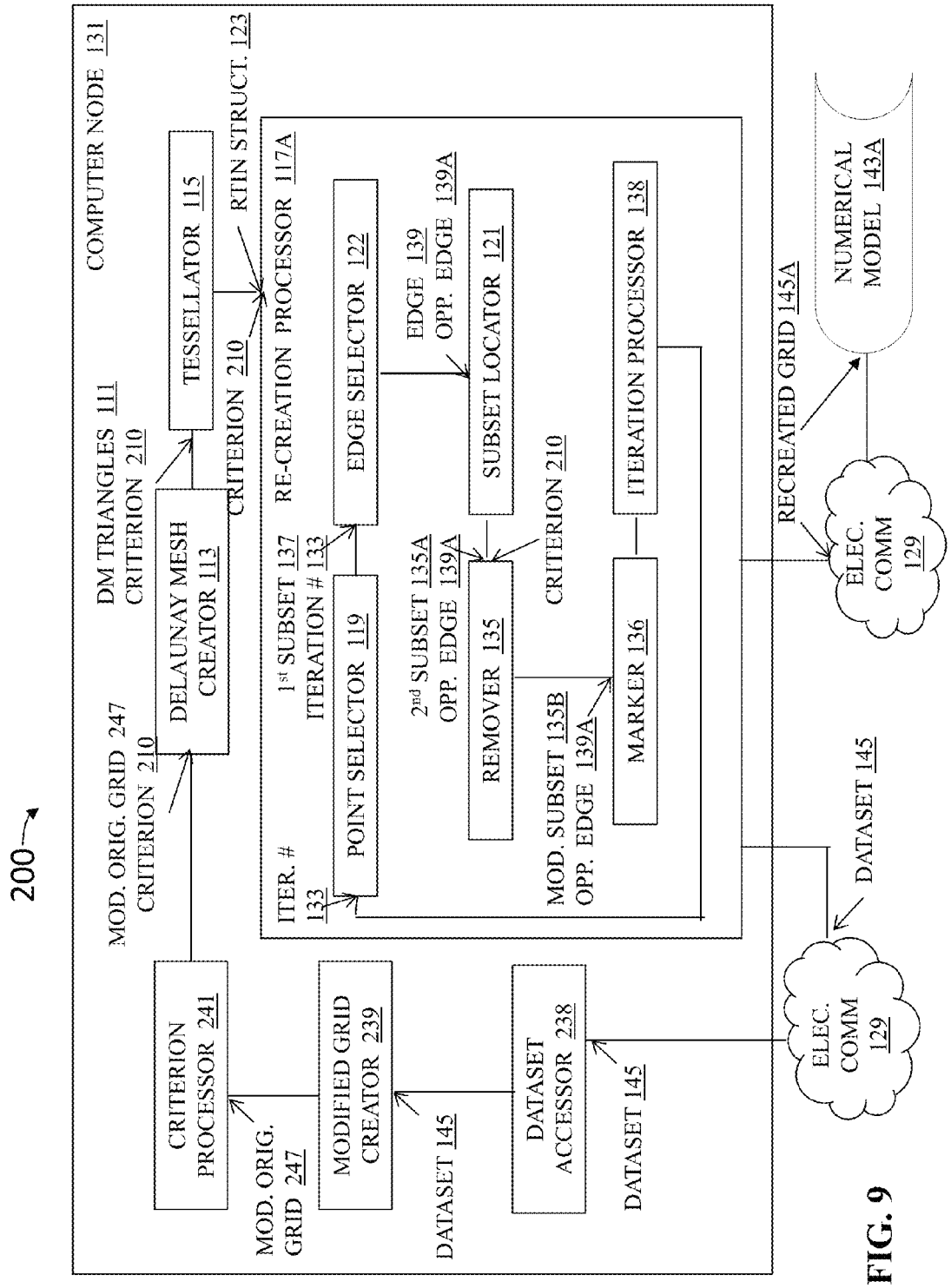
FIG. 9 is a schematic block diagram of an alternate embodiment of the system of the present teachings.

Referring to FIG. 9, in another embodiment, dataset 145 including the numbers of x and y values in an original grid, $\Delta x$ and $\Delta y$ of the original grid, and the x/y/z values remaining after thinning of the original grid according to the system and method of the present embodiment, can be processed to produce the original grid by regenerating Delaunay mesh triangle definitions. System 200 can include, but is not limited to including, dataset accessor 238 retrieving dataset 145, modified grid creator 239 beginning from an origin point, such as, for example, the point at the lower left corner of the grid, and creating modified original grid 247 by interpolating between the remaining x/y/z at $\Delta x$ and $\Delta y$ points for the numbers of x and y values in the original grid. Modified grid creator 239 can also flag points in modified original grid 247 that are added to modified original grid 247 that are not original x/y/z values. System 200 can include criterion processor 241 that sets criterion 210 to be based on the flagged points, i.e. to instruct re-creation processor 117A to removed the flagged points. Criterion processor 241 supplies modified original grid 247 to Delaunay mesh creator 113 to begin the process of thinning modified original grid 247 by removing the flagged points. Delaunay mesh creator 113 creates, by a special purpose computer, a Delaunay mesh from modified original grid 247. The Delaunay mesh provides resulting triangles 111 and criterion 210 to tessellator 115. Tessellator 115 tessellates, by the special purpose computer, resulting triangles 111 to form right-triangulated irregular network (RTIN) structure 123 which can be fully reduced to two triangles. RTIN structure 123 includes a plurality of points and a plurality of edges. Tessellator 115 provides criterion 210 and RTIN structure 123 to re-creation processor 117A which recreates, by the special purpose computer, the original grid using RTIN structure 123 and pre-selected criterion 210. Re-creation processor 117A can include, but is not limited to including point selector 119 selecting first subset 137 of points from the plurality of points based on angles that edges of the plurality of edges form with each of the plurality of points. Point selector 119 provides first subset 137 to edge selector 122 which selects for each of the points in first subset 137, one of the plurality of edges for deletion evaluation based on iteration number 133 and the one of each of the points (the selected point), the selected edge 139 having opposing edge 139A of opposite orientation from selected edge 139. Edge selector 122 provides edge 139 and opposing edge 139A to subset locataor 121 which locates second subset 135A of the plurality of points, second subset 135A includes the points of the plurality of points along selected edge 139. Subset locator 121 provides second subset 135A and opposing edge 139A to remover 135 which removes, for each of the points in first subset 137, the point and the opposing edge if the points of second subset 135A meet pre-selected criterion 210. Remover 135 provides modified subset 135B and opposing edge 139A to marker 136 which, for each of the points in first subset 137 not removed previously, marks the not-removed points as not available to be selected by point selector 119. Marker 136 returns execution control to iteration processor 138 which, among other things, increments iteration number 133 and invokes point selector 119 until no points are found. Re-creation processor can provide re-created grid 145A to numerical model 143A, for example, through electronic communications 129, among other ways. The original triangle definitions are thus recreated.

Figure 10A:
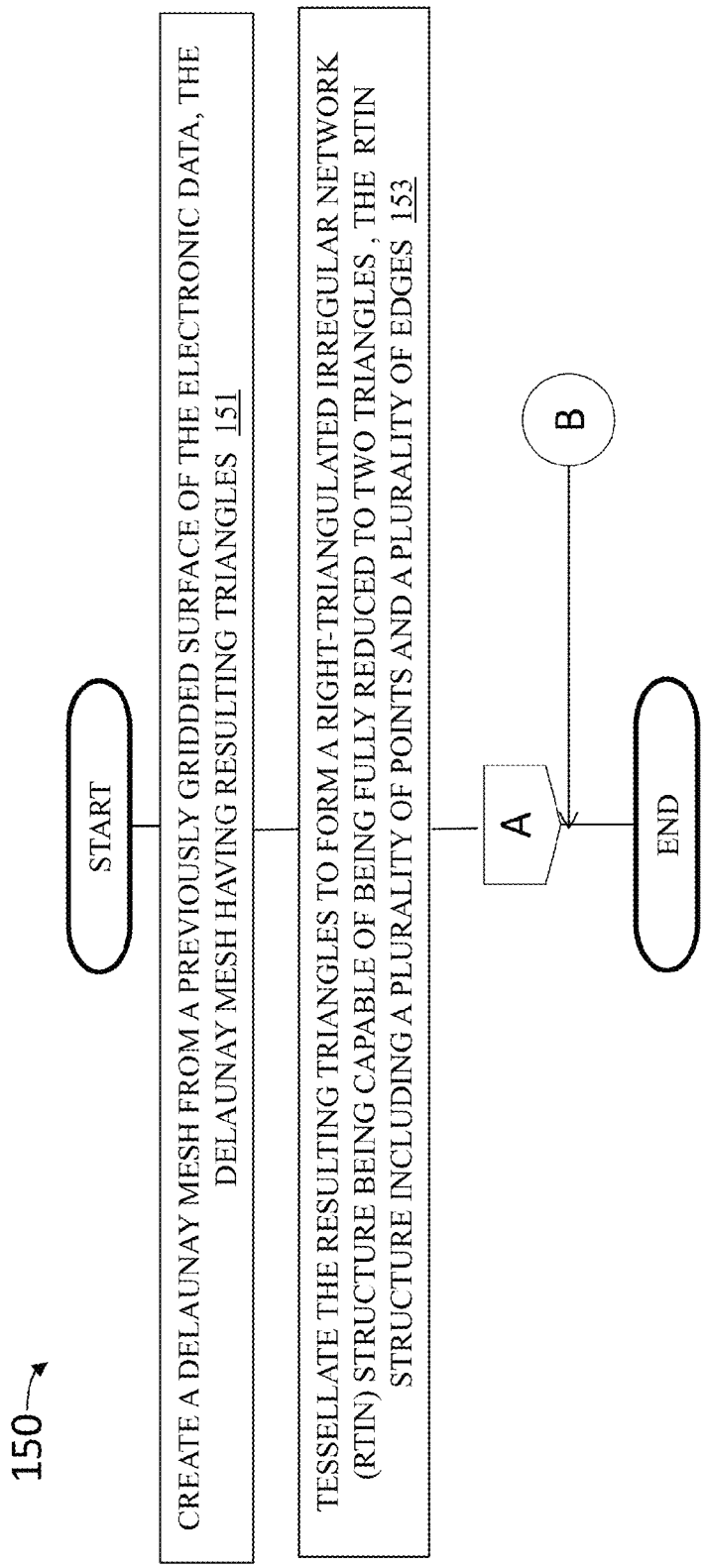
FIGS. 10A and 10B are flowcharts of an embodiment of the method of the present teachings.
Figure 10B:
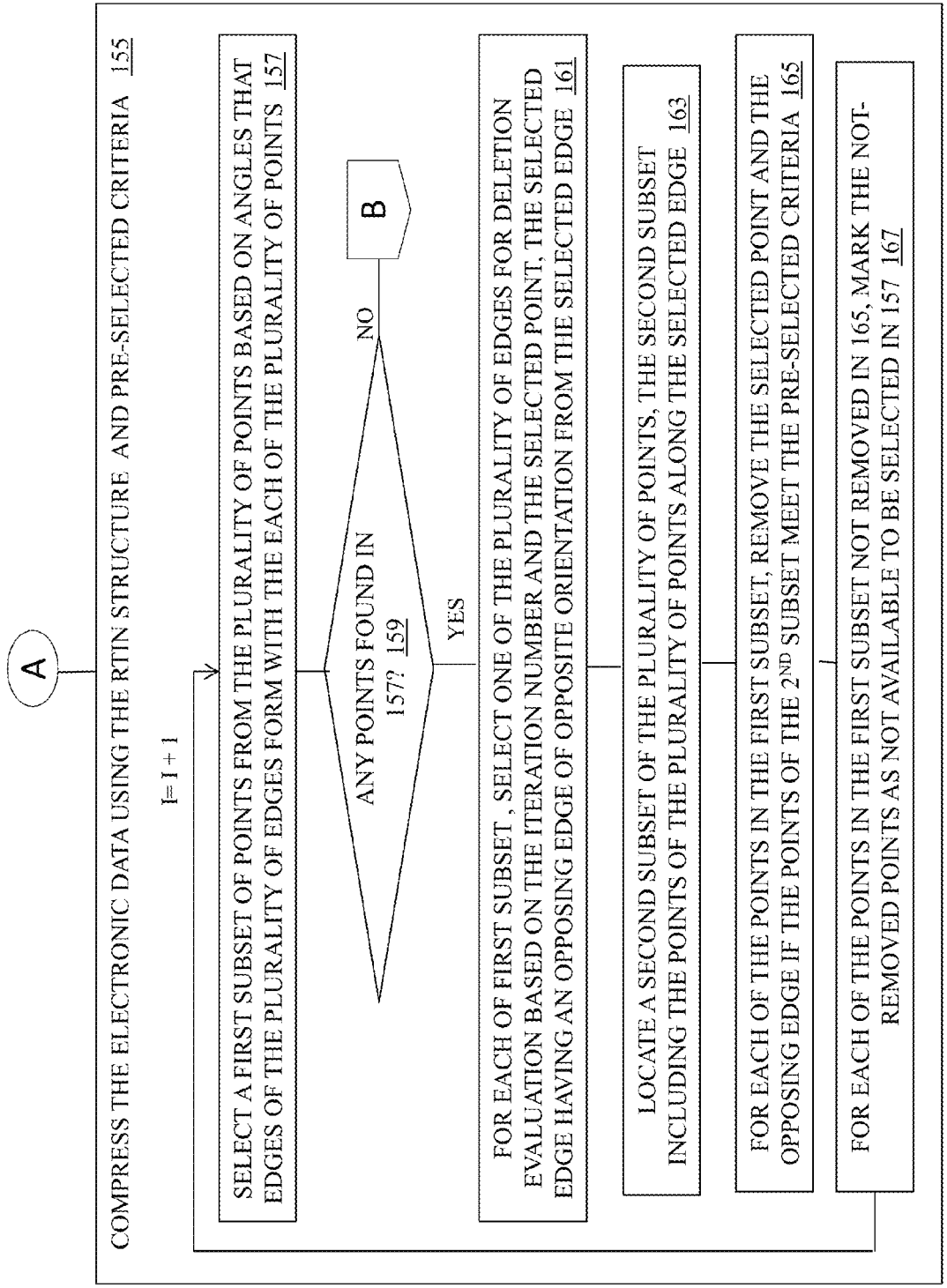

Referring now to FIGS. 10A and 10B, method 150 for compressing electronic data can include, but is not limited to including, creating 151, by a special purpose computer, a Delaunay mesh from a previously gridded surface of the electronic data, the Delaunay mesh having resulting triangles, and tessellating 153, by the special purpose computer, the resulting triangles to form a right-triangulated irregular network (RTIN) structure being capable of being fully reduced to two triangles, the RTIN structure including a plurality of points and a plurality of edges. System 200 can also include compressing 155, by the special purpose computer, the electronic data using the RTIN structure and pre-selected criteria including: (a) incrementing an iteration number, (b) selecting 157 a first subset of points from the plurality of points based on angles that edges of the plurality of edges form with each of the plurality of points, (b) if 159 there are points found in the (b), and (c) selecting 161, for each of the points in the first subset, one of the plurality of edges for deletion evaluation based on the iteration number and the selected point, the selected edge having an opposing edge of opposite orientation from the selected edge. Method 150 can also include (d) locating 163 a second subset of the plurality of points, the second subset including the points of the plurality of points along the selected edge, (e) for each of the points in the first subset, removing 165 the selected point and the opposing edge if the points of the second subset meet the pre-selected criteria, and (f) for each of the points in the first subset not removed in (e), marking 167 the not-removed points as not available to be selected in (b), and (g) repeating (a) through (f) until no points are found in (b).

Figure 11A:
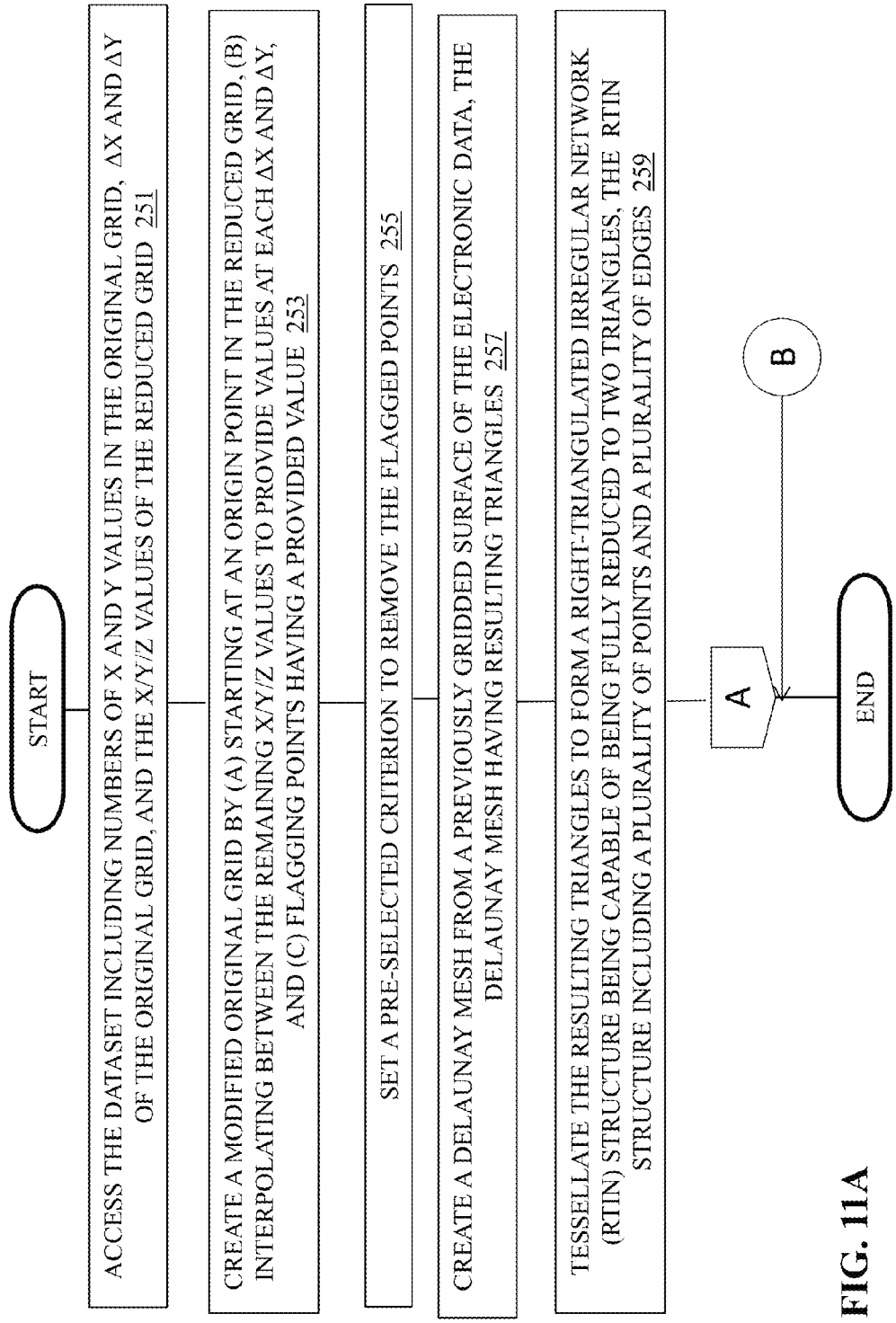
FIGS. 11A and 11B are flowcharts of an embodiment of the method of the present teachings.
Figure 11B:
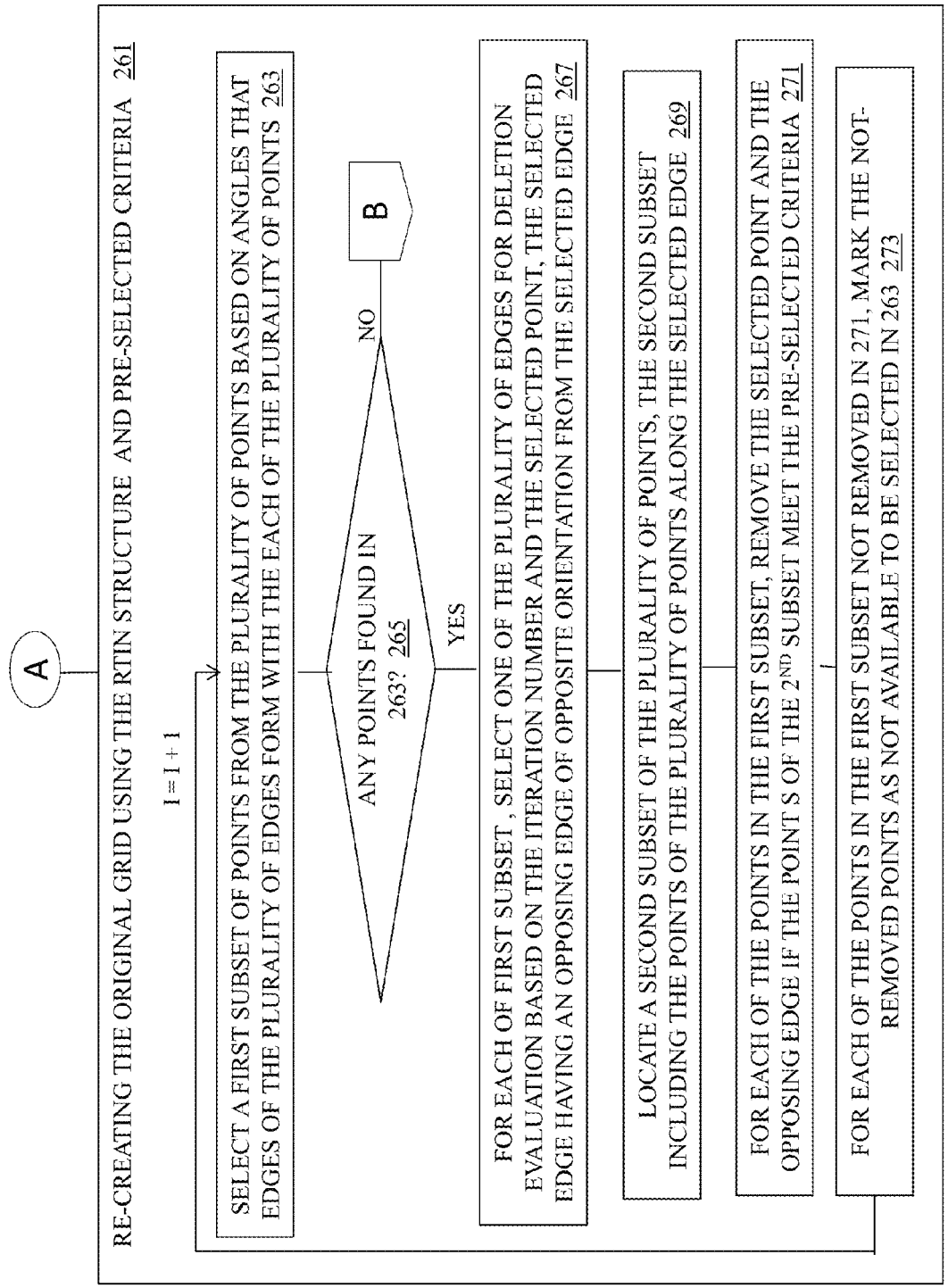

Referring now to FIGS. 11A and 11B, in another embodiment, method 250 for re-creating an original encrypted latitude/longitude grid of geospatial data from a dataset compressed according to a bottom-up RTIN method can include, but is not limited to including, accessing 251 the dataset including numbers of x and y values in the original grid, $\Delta x$ and $\Delta y$ of the original grid, and the x/y/z values of the dataset, creating 253 a modified original grid by (a) starting at an origin point in the dataset, (b) interpolating between the remaining x/y/z values to provide values at each $\Delta x$ and $\Delta y$, and (c) flagging points having a provided value, and setting 255 a pre-selected criterion to remove the flagged points. Method 250 can also include creating 257, by a special purpose computer, a Delaunay mesh from the modified original grid, the Delaunay mesh having resulting triangles, and tessellating 259, by the special purpose computer, the resulting triangles to form a right-triangulated irregular network (RTIN) structure being capable of being fully reduced to two triangles, the RTIN structure including a plurality of points and a plurality of edges. System 250 can still further include re-creating 261, by the special purpose computer, the original grid using the RTIN structure and the pre-selected criterion including: (a) incrementing an iteration number, (b) selecting 263 a first subset of points from the plurality of points based on angles that edges of the plurality of edges form with each of the plurality of points. If 265 there are points found in 263, (c) selecting 267 one of the plurality of edges for deletion evaluation based on the iteration number and the selected point, the selected edge having an opposing edge of opposite orientation from the selected edge, and (d) locating 269 a second subset of the plurality of points, the second subset including the points of the plurality of points along the selected edge. Method 250 can further include (e) for each of the points in the first subset, removing 271 the point and the opposing edge if the points of the second subset meet the pre-selected criteria, (f) for each of the points in the first subset not removed in (e), marking 273 the not-removed points as not available to be selected in (b), and (g) repeating 265 (a) through (f) until no points are found in (b).

Figure 12A:
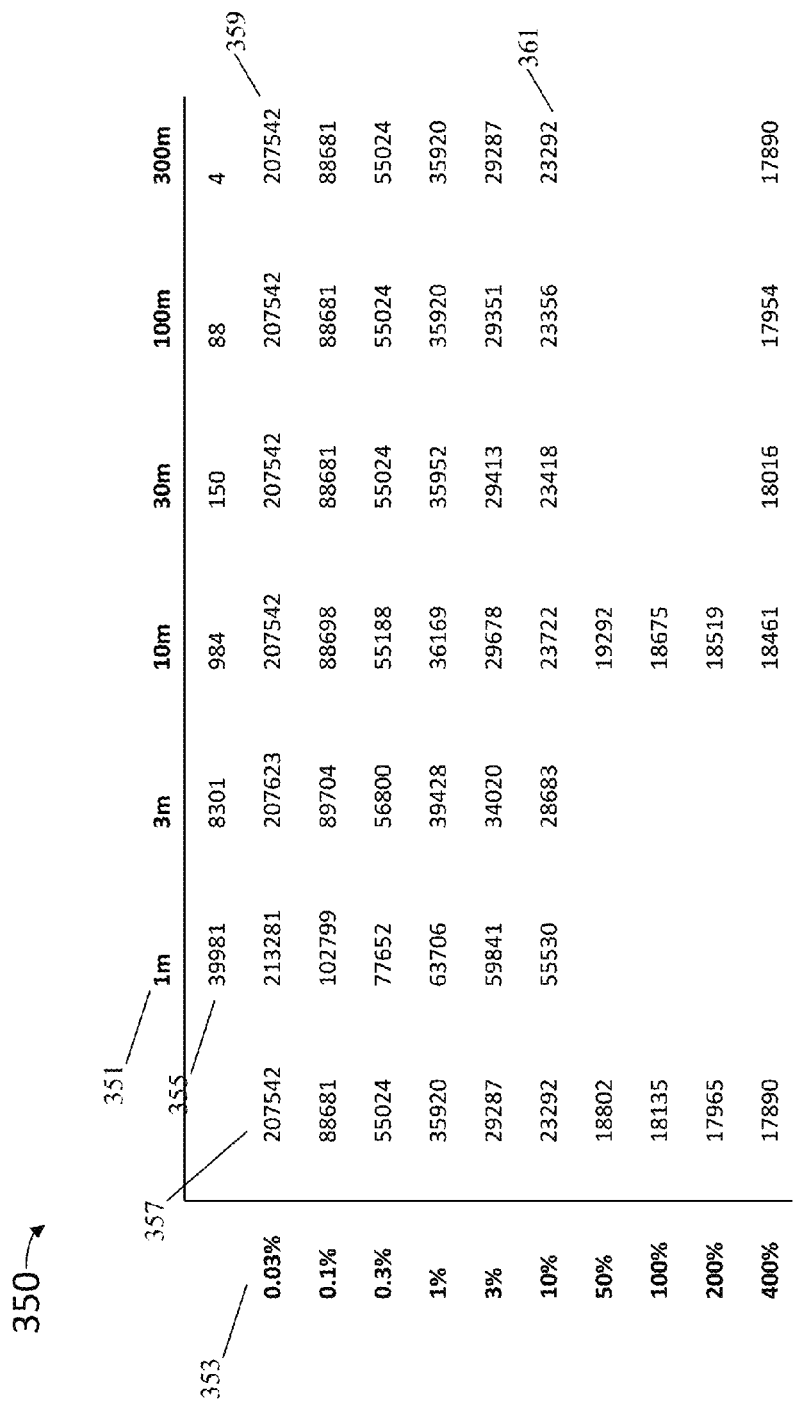
FIG. 12A is a table of RTIN thinning results of the Hurricane Ike source grid that has 1,050,625 numeric depth values.

Referring now to FIG. 12A, table 350 shows thinned RTIN thinning results using a Hurricane Ike source grid that has 1,050,625 numeric depth values. Row 351 illustrates a fixed distance metric and column 353 illustrates the % of the depth metric used for each test. Table 350 entries are the number of points retained after thinning Row 355 indicates fewer retained points as the fixed metric of row 351 is increased. Column 357 indicates that as the percent metric of column 353 is increased, the number of points retained decreases. The number of points retained when both metrics are combined is typically not the sum of the points retained using each metric independently. For example, the 10 m metric retained 984 pts and the 10% metric retained 23,292 points for a sum of 24,276 points, while the combined metric test retained 23,722 points. Depending on the values of the two metrics, and of course the characteristics of the data set, one parameter or the other may dominate. In row 359, the % metric in column 353 dominates the result until the fixed metric in row 351 gets quite small. In row 361, the % metric dominates only for the very large fixed metric. Referring now to FIG. 12B, shown are the percentages of the original number of points remaining after thinning according to the system and method of the present teachings.

Embodiments of the present teachings are directed to computer systems such as system 100 (FIG. 8) and system 200 (FIG. 9) for accomplishing the methods such as method 150 (FIGS. 10A and 10B) and method 250 (FIGS. 11A and 11B) discussed in the description herein, and to computer readable media containing programs for accomplishing these methods. The raw data and results can be stored for future retrieval and processing, printed, displayed, transferred to another computer, and/or transferred elsewhere. Communications links such as electronic communications 129 (FIG. 8) can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Methods such as methods 150 (FIGS. 10A and 10B) and method 250 (FIGS. 11A and 11B) of the present embodiment can be, in whole or in part, implemented electronically. Signals representing actions taken by elements of the system and other disclosed embodiments can travel over at least one live communications network 129 (FIG. 8). Control and data information can be electronically executed and stored on at least one computer-readable medium. System 100 (FIG. 8) and system 200 (FIG. 9) can be implemented to execute on at least one computer node in at least one live communications network 129 (FIG. 8). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer method for compressing electronic data comprising:
   creating, by a special purpose computer, a Delaunay mesh from a previously gridded surface of the electronic data, the Delaunay mesh having resulting triangles;
   tessellating, by the special purpose computer, the resulting triangles to form a right-triangulated irregular network (RTIN) structure being capable of being fully reduced to two triangles, the RTIN structure including a plurality of points and a plurality of edges; and
   compressing, by the special purpose computer, the electronic data using the RTIN structure and pre-selected criteria including:
   (a) incrementing an iteration number;
   (b) selecting a first subset of points from the plurality of points based on angles that edges of the plurality of edges form with the each of the plurality of points;
   (c) for each of the points in the first subset, selecting one of the plurality of edges for deletion evaluation based on the iteration number and the selected point, the selected edge having an opposing edge of opposite orientation from the selected edge;
   (d) locating a second subset of the plurality of points, the second subset including the points of the plurality of points along the selected edge;
   (e) for each of the points in the first subset, removing the selected point and the opposing edge if the points of the second subset meet the pre-selected criteria;
   (f) for each of the points in the first subset not removed in (e), marking the not-removed points as not available to be selected in (b); and
   (g) repeating (a) through (f) until no points are found in (b).

2. The method as in claim 1 wherein the pre-selected criteria comprise the difference between a characteristic of the selected point and a linear interpolation of the characteristic at the point.

3. The method as in claim 2 wherein the characteristic comprises a distance metric specifying a flat value, the flat value effectively flattening areas that vary less than the pre-selected criteria.

4. The method as in claim 2 wherein the characteristic comprises a percentage metric specifying a dynamic value as a percentage of the characteristic of the point.

5. The method as in claim 2 wherein one of the pre-selected criteria comprises a gradient.

6. The method as in claim 1 comprising:
receiving the pre-selected criteria from a user.

7. A computer system for compressing electronic data comprising:
a Delaunay mesh creator, executing on a special purpose computer, creating a Delaunay mesh from a previously gridded surface of the electronic data, the Delaunay mesh having resulting triangles;
a tessellator, executing on the special purpose computer, tessellating the resulting triangles to form a right-triangulated irregular network (RTIN) structure being capable of being fully reduced to two triangles, the RTIN structure including a plurality of points and a plurality of edges; and
a compression processor compressing, by the special purpose computer, the electronic data using the RTIN structure and pre-selected criteria including:
a point selector, executing on the special purpose computer, selecting a first subset of points from the plurality of points based on angles that edges of the plurality of edges form with each of the plurality of points;
an edge selector, executing on the special purpose computer, selecting one of the plurality of edges for deletion evaluation based on the iteration number and the selected point, the selected edge having an opposing edge of opposite orientation from the selected edge;
a subset locator, executing on the special purpose computer, locating a second subset of the plurality of points, the second subset including subset points of the plurality of points along the selected edge;
a remover, executing on the special purpose computer, for each of the subset points in the first subset, removing the subset point and the opposing edge if the points of the second subset meet the pre-selected criteria forming a modified subset;
a marker, executing on the special purpose computer, for each of the points in the first subset not removed by the remover, marking the not-removed points as not available to be selected by the point selector; and
an iteration processor, executing on the special purpose computer, maintaining an iteration number, the iteration processor incrementing the iteration number and repeating execution of the point selector, the edge selector, the subset locator, the remover, and the marker until no points are found by the point selector.

8. The system as in claim 7 further wherein the pre-selected criteria comprise the difference between a characteristic of the selected point and a linear interpolation of the characteristic at the point.

9. The system as in claim 8 wherein the characteristic comprises a distance metric specifying a flat value, the flat value flattening areas that vary less than the pre-selected criteria.

10. The system as in claim 8 wherein the characteristic comprises a percentage metric specifying a dynamic value as a percentage of the characteristic of the point.

11. The system as in claim 7 wherein the compression processor receives the pre-selected criteria from a user.

12. The system as in claim 7 wherein one of the pre-selected criteria comprises a gradient.

13. A method for recreating an original encrypted latitude/longitude grid of geospatial data from a dataset compressed according to a bottom-up RTIN method comprising:
accessing the dataset including numbers of x and y values in the original grid, $\Delta x$ and $\Delta y$ of the original grid, and the x/y/z values of the dataset;
creating a modified original grid by (a) starting at an origin point in the dataset, (b) interpolating between the remaining x/y/z values to provide values at each $\Delta x$ and $\Delta y$, and (c) flagging points having a provided value;
setting a pre-selected criterion to remove the flagged points;
creating, by a special purpose computer, a Delaunay mesh from the modified original grid, the Delaunay mesh having resulting triangles;
tessellating, by the special purpose computer, the resulting triangles to form a right-triangulated irregular network (RTIN) structure being capable of being fully reduced to two triangles, the RTIN structure including a plurality of points and a plurality of edges; and
recreating, by the special purpose computer, the original grid using the RTIN structure and the pre-selected criterion including:
(a) incrementing an iteration number;
(b) selecting a first subset of points from the plurality of points based on angles that edges of the plurality of edges form with each of the plurality of points;
(c) for each of the points in the first subset, selecting one of the plurality of edges for deletion evaluation based on the iteration number and the selected point, the selected edge having an opposing edge of opposite orientation from the selected edge;
(d) locating a second subset of the plurality of points, the second subset including the points of the plurality of points along the selected edge;
(e) for each of the points in the first subset, removing the point and the opposing edge if the points of the second subset meet the pre-selected criteria;
(f) for each of the points in the first subset not removed in (e), marking the not-removed points as not available to be selected in (b); and
(g) repeating (a) through (f) until no points are found in (b).

14. The method as in claim 13 wherein removing the point and opposing edge further comprises:
attaching edges surrounding the removed point to each other at the location of the point.

* * * * *